US012755735B2

(12) United States Patent
Yu et al.

(10) Patent No.: US 12,755,735 B2
(45) Date of Patent: Oct. 6, 2026

(54) CHATBOT SERVICE PROVIDING METHOD AND CHATBOT SERVICE PROVIDING SYSTEM BASED ON KEYWORD USAGE AND VISUAL INDICATION

(71) Applicants: Hyundai Motor Company, Seoul (KR); Kia Corporation, Seoul (KR)

(72) Inventors: Jisang Yu, Yongin-Si (KR); Myungho Noh, Anyang-Si (KR); Chanmin Park, Seoul (KR); Youngmin Park, Seoul (KR); Donghyeon Lee, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 158 days.

(21) Appl. No.: 18/384,272

(22) Filed: Oct. 26, 2023

(65) Prior Publication Data

US 2024/0214332 A1 Jun. 27, 2024

(30) Foreign Application Priority Data

Dec. 27, 2022 (KR) ........................ 10-2022-0186202

(51) Int. Cl.

| | |
|---|---|
| ***G10L 15/22*** | (2006.01) |
| ***G06F 16/242*** | (2019.01) |
| ***G06F 16/9032*** | (2019.01) |
| ***G06F 16/9038*** | (2019.01) |
| ***G06F 40/30*** | (2020.01) |

(Continued)

(52) U.S. Cl.

CPC .......... *G10L 15/22* (2013.01); *G06F 16/2428* (2019.01); *G06F 16/90332* (2019.01); *G06F 16/9038* (2019.01); *G06F 40/30* (2020.01); *G10L 15/26* (2013.01); *H04L 51/02* (2013.01); (Continued)

(58) Field of Classification Search

CPC ... G10L 15/22; G10L 15/26; G10L 2015/221; G10L 2015/223; G06F 16/90332; G06F 16/9038; G06F 40/30; H04L 51/02

See application file for complete search history.

(56) References Cited

U.S. PATENT DOCUMENTS 6,311,150 B1 * 10/2001 Ramaswamy ........ G06F 40/279 704/1
7,343,551 B1 * 3/2008 Bourdev ................. G06F 40/30 715/224

(Continued)

FOREIGN PATENT DOCUMENTS

JP 2017-37601 A 2/2017
KR 101944353 B1 4/2019

(Continued)

*Primary Examiner* — Justin R. Blaufeld
(74) *Attorney, Agent, or Firm* — Banner & Witcoff, Ltd.

(57) ABSTRACT

A method for providing chatbot service may include generating, based on input text received via a user interface device, a plurality of key words and a plurality of types associated with the plurality of key words, classifying, based on the generated key words and the types, an intent associated with the input text, based on the classified intent and at least of one of the key words, searching for information, displaying, on a display of the user interface device, the searched information and the plurality of key words, and adding, on the display of the user interface device, at least a visual effect for indicating whether a key word of the plurality of key words was used for the searching.

20 Claims, 14 Drawing Sheets

(51) Int. Cl.
*G10L 15/26* (2006.01)
*H04L 51/02* (2022.01)

(52) U.S. Cl.
CPC .. *G10L 2015/221* (2013.01); *G10L 2015/223* (2013.01)

(56) References Cited

U.S. PATENT DOCUMENTS 7,899,818 B2 * 3/2011 Stonehocker ....... G06F 16/3325 715/780
8,645,825 B1 * 2/2014 Cornea ................. G06F 40/232 715/257
10,678,516 B2 6/2020 Myung et al.
11,152,002 B2 * 10/2021 Walker, II ............... G10L 15/22
11,646,022 B2 5/2023 Kang et al.
12,307,272 B2 * 5/2025 McKinley ............... G06F 9/453
2007/0011154 A1 * 1/2007 Musgrove ............... G06F 40/30 707/999.005
2007/0282811 A1 * 12/2007 Musgrove ........... G06F 16/3338
2008/0021960 A1 * 1/2008 Chu ..................... G06Q 10/107 709/206
2008/0275868 A1 * 11/2008 Zer ..................... G06F 16/2428 707/999.005
2008/0288869 A1 * 11/2008 Ubillos .............. H04N 1/00453 715/716
2009/0157669 A1 * 6/2009 Nakayama ............ G06F 16/951 707/999.005
2011/0208822 A1 * 8/2011 Rathod .................. G06Q 30/02 709/206
2013/0311997 A1 * 11/2013 Gruber ...................... G06F 9/46 718/102
2013/0339343 A1 * 12/2013 Hierons .................. G06F 16/68 707/E17.014
2014/0040746 A1 * 2/2014 Reich ...................... G06F 3/167 715/728
2014/0279050 A1 * 9/2014 Makar ................. G06F 16/9535 705/14.66
2015/0112962 A1 * 4/2015 Simhon ................. G06F 16/951 707/709
2016/0125027 A1 * 5/2016 Ohara .................. G06F 3/0488 707/767
2016/0217784 A1 * 7/2016 Gelfenbeyn ........ G06F 3/04842
2017/0075877 A1 * 3/2017 Lepeltier ............... G06F 40/117
2017/0132019 A1 * 5/2017 Karashchuk ............ G06F 9/453
2017/0180284 A1 * 6/2017 Smullen .................. H04L 63/18
2017/0243107 A1 * 8/2017 Jolley ...................... G06N 5/02
2018/0143802 A1 * 5/2018 Jang ........................ G10L 15/30
2018/0144047 A1 * 5/2018 Beller ...................... G06F 16/34
2018/0190274 A1 * 7/2018 Kirazci .................... G10L 15/22
2018/0293601 A1 * 10/2018 Glazier .............. G06Q 30/0214
2018/0301150 A1 * 10/2018 Woo .................... G06F 3/04842
2018/0316634 A1 * 11/2018 Driscoll .................. H04L 51/04
2019/0028418 A1 * 1/2019 Ban ......................... H04L 51/06
2019/0258456 A1 * 8/2019 Byun ...................... H04L 51/02
2019/0272296 A1 * 9/2019 Prakash ............ G06F 16/24534
2020/0051559 A1 * 2/2020 Park .................. G06F 16/90332
2020/0074993 A1 3/2020 Lee et al.
2020/0152172 A1 * 5/2020 Yoo ................... G06F 16/90344
2020/0401590 A1 * 12/2020 Staar ....................... G06F 40/30
2021/0149963 A1 * 5/2021 Agarwal ........... G06F 16/90332
2021/0233527 A1 * 7/2021 Aihara .................... G06F 3/167
2021/0249002 A1 * 8/2021 Ahmadidaneshashtiani ................ H04L 51/02
2022/0156256 A1 * 5/2022 Mitra .................... G06F 3/0482
2022/0399009 A1 * 12/2022 Okada ................. G06F 16/9027

FOREIGN PATENT DOCUMENTS

KR 10-2019-0100512 A 8/2019
KR 10-2021-0062486 A 5/2021
KR 102398361 B1 5/2022

* cited by examiner

CHATBOT SERVICE PROVIDING METHOD AND CHATBOT SERVICE PROVIDING SYSTEM BASED ON KEYWORD USAGE AND VISUAL INDICATION

CROSS-REFERENCE TO RELATED APPLICATION

This application is based on and claims priority to Korean Patent Application No. 10-2022-0186202, filed on Dec. 27, 2022 in the Korean Intellectual Property Office, the disclosure of which is incorporated herein by reference.

TECHNICAL FIELD

The disclosure relates to a chatbot service providing method and a chatbot service providing system that may provide an improved user experience.

BACKGROUND

A chatbot service that could only respond to predefined sentences may be substituted with a neural network-based chatbot service.

A chatbot service may provide a response corresponding to a user's voice command while maintaining desirable response rates and accuracy.

However, if a user fails to receive a desired response from a chatbot service without understanding a reason behind the failure, the user experience may be deteriorated.

SUMMARY

According to the present disclosure, a method may comprise generating, based on input text received via a user interface device, a plurality of key words and a plurality of types associated with the plurality of key words; classifying, based on the generated key words and the types, an intent associated with the input text; based on the classified intent and at least of one of the key words, searching for information; displaying, on a display of the user interface device, the searched information and the plurality of key words; and adding, on the display of the user interface device, at least a visual effect for indicating whether a key word of the plurality of key words was used for the searching. The searching may comprise determining, based on an order of the input text, priorities of the plurality of key words; and based on the determined priorities, searching for the information.

The searching may comprise based on using a key word having a highest priority among the plurality of key words and excluding at least one of the plurality of key words, searching for the information. The method may further comprise displaying the input text on the display, wherein the displaying the plurality of key words comprises displaying, separately from the input text displayed on the display, the plurality of key words. The adding may comprise displaying the visual effect for distinguishing a first key word, of the plurality of key words, used in the searching from a second key word, of the plurality of key words, excluded in the searching.

The searching may comprise, based on a previous input text received via the user interface device, utilizing a previous key word generated from the previous input text. The adding may comprise displaying the visual effect for distinguishing, among the plurality of key words displayed on the display, a first key word, of the plurality of key words, used in the searching; a second key word, of the plurality of key words, excluded in the searching; and the previous key word. The displaying the plurality of key words may further comprise displaying a logical operator used in the searching. The method may further comprise receiving a user input; editing, based on the received user input, the plurality of key words; and based on the edited plurality of key words, searching again for the information. The user input may include at least one of: a first user input for deleting at least one of the plurality of key words; a second user input for modifying at least one of the plurality of key words to another key word; or a third user input for changing priorities of the plurality of key words by changing relative positions of the plurality of key words on the display.

According to the present disclosure, an apparatus may comprise at least one processor; and a memory storing at least one instruction, that, when executed by the at least one processor, may cause the apparatus to perform: generating, based on input text received via a user interface device, a plurality of key words and a plurality of types associated with the plurality of key words; classifying, based on the generated key words and the types, an intent associated with the input text; based on the classified intent and at least of one of the key words, searching for information; displaying, on a display of the user interface device, the searched information and the plurality of key words; and adding, on the display of the user interface device, a visual effect for indicating whether a key word of the plurality of key words was used for the searching. The at least one instruction, when executed by the at least one processor, may cause the apparatus to perform the searching by: determining, based on an order of the input text, priorities of the plurality of key words; and based on the determining, searching for the information.

The at least one instruction, when executed by the at least one processor, may cause the apparatus to perform the searching by: based on using a key word having a highest priority among the plurality of key words and excluding at least one of the plurality of key words, searching for the information. The at least one instruction, when executed by the at least one processor, may cause the apparatus to perform the displaying the plurality of key words by: displaying the input text on the display; and displaying, separately from the input text displayed on the display, the plurality of key words.

The at least one instruction, when executed by the at least one processor, may cause the apparatus to perform the adding by: displaying the visual effect for distinguishing a first key word, of the plurality of key words, used in the searching from a second key word, of the plurality of key words, excluded in the searching. The at least one instruction, when executed by the at least one processor, may cause the apparatus to perform the searching, based on a previous input text received via the user interface device, by utilizing a previous key word generated from the previous input text.

The at least one instruction, when executed by the at least one processor, may cause the apparatus to perform the adding by displaying the visual effect for distinguishing, among the plurality of key words displayed on the display, a first key word used in the searching; a second key word excluded in the searching; and the previous key word. The at least one instruction, when executed by the at least one processor, may cause the apparatus to perform the displaying the plurality of key words by displaying a logical operator used in the searching.

The at least one instruction, when executed by the at least one processor, may further cause the apparatus to perform:

receiving a user input for; editing, based on the received user input, the plurality of key words; and based on the edited plurality of key words, searching again for the information. The user input may include at least one of: a first user input for deleting at least one of the plurality of key words; a second user input for modifying at least one of the plurality of key words to another key word; or a third user input for changing priorities of the plurality of key words by changing relative positions of the plurality of key words on the display.

BRIEF DESCRIPTION OF THE DRAWINGS

These and/or other examples of the disclosure will become apparent and more readily appreciated from the following description of the examples, taken in conjunction with the accompanying drawings of which.

DETAILED DESCRIPTION

Figure 1:
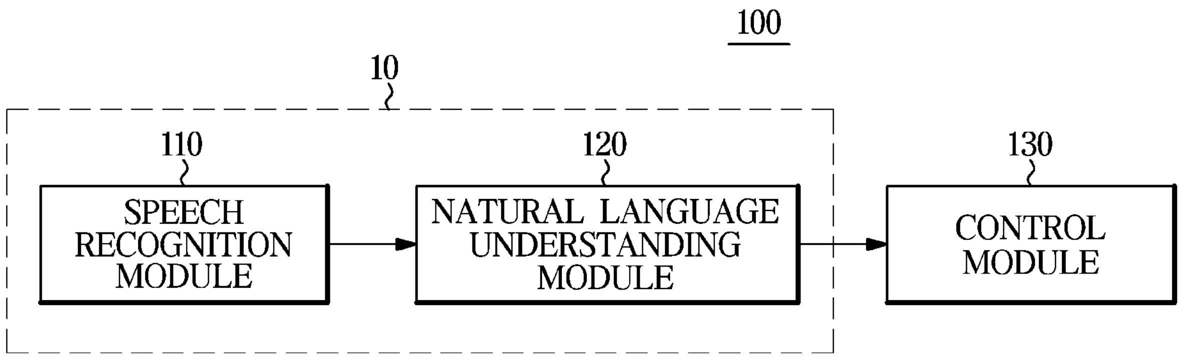
FIG. 1 shows an example of a configuration of a natural language processing device.

Advantages and features of examples, and methods of achieving the same will be clearly understood with reference to the accompanying drawings and the following detailed examples. However, the present inventive concept is not limited to examples described herein, but may be implemented in various different forms. Examples are provided in order to explain the present inventive concept for those skilled in the art. The scope of the present inventive concept is defined by the appended claims.

The terms used herein will be briefly described and examples will be described in detail.

Although the terms used herein are selected from among general terms used in consideration of functions in examples, these may be changed according to intentions or customs of those skilled in the art or the advent of new technology. In addition, in a specific case, some terms may be arbitrary selected by applicants. In this case, meanings thereof will be described in a corresponding description of examples. Therefore, the meanings of terms used herein should be interpreted based on substantial meanings of the terms and content of this entire specification, rather than simply the terms themselves.

Throughout this specification, if a certain part "includes" a certain component, it means that another component may be further included not excluding another component unless otherwise defined. Moreover, terms described in the specification such as "part," "module," and "unit," refer to a unit of processing at least one function or operation, and may be implemented by software, a hardware component such as a field-programmable gate array (FPGA) or an application-specific integrated circuit (ASIC), or a combination of software and hardware. However, the terms "part," "module," "unit," and the like are not limited to software or hardware. "Part," "module," "unit," and the like may be configured in a recording medium that may be addressed or may be configured to be reproduced on at least one processor. Therefore, examples of the terms "part," "module," "unit," and the like include software components, object-oriented software components, components such as class components and task components, processes, functions, properties, procedures, subroutines, segments in program codes, drivers, firmware, microcode, circuits, data, databases, data structures, tables, arrays, and variables. The components and the modules may be provided into smaller number of components and modules such that the respective component and modules may be merged in respect to the functionality.

Reference numerals used for method steps are just used for convenience of explanation, but not to limit an order of the steps. Thus, unless the context clearly dictates otherwise, the written order may be practiced otherwise.

Hereinafter, examples of a chatbot service providing method and system will be described in detail with reference to the accompanying drawings. In addition, parts irrelevant to description are omitted in the drawings in order to clearly explain examples. In the accompanying drawings, parts that are identical or equivalent to each other will be assisted the same reference numerals, and in the following description of the examples, details of redundant descriptions thereof will be omitted.

FIG. 1 shows an example of a configuration of a natural language processing device.

A natural language processing device 100 may include a speech processing module 10 processing a user's voice command and/or a control module 130 providing a response corresponding to a user intention.

The speech processing module 10 may include a speech recognition module 110 converting the user's voice command into text and a natural language understanding module 120 determining a user intention corresponding to the text.

The speech recognition module 110 may be implemented with a speech to text (STT) engine, and perform conversion into text by applying a speech recognition algorithm to a user's speech.

For example, the speech recognition module 110 may extract feature vectors from the user's speech by applying a feature vector extraction method such as a cepstrum, a linear predictive coefficient (LPC), a Mel frequency cepstral coefficient (MFCC), a filter bank energy, or the like.

Also, a recognition result may be obtained by comparing extracted feature vectors and trained reference patterns. To this end, an acoustic model for modeling and comparing signal characteristics of voice or a language model for modeling a linguistic order of recognition vocabulary such as words or syllables may be used.

In addition, the speech recognition module 110 may convert a voice signal into text based on learning where deep learning or machine learning may be applied. According to the example, a way of converting the voice signal into the text by the speech recognition module 110 is not limited thereto, and a variety of speech recognition technologies may be applied to convert the voice signal into the text.

The natural language understanding module 120 may apply a natural language understanding (NLU) technique to determine a user intention included in the text. Accordingly, the natural language understanding module 120 may include an NLU engine that determines the user intention by applying the NLU technique to an input sentence. Here, the text output by the speech recognition module 110 is an input sentence input to the natural language understanding module 120.

For instance, the natural language understanding module 120 may recognize a named entity from the input text. The named entity may be a proper noun such as a name of an individual person, place, organization, time, day, currency, and the like. Named-entity recognition (NER) is for identifying a named entity in a sentence and classifying a type of the identified named entity. A keyword may be extracted from the sentence through named-entity recognition to understand the meaning of the sentence.

Also, the natural language understanding module 120 may determine a domain from the input sentence. The domain may be for identifying a subject of user's speech. For example, domains representing various subjects such as providing information about a recommended item, schedule, information about weather or traffic conditions, text transmission, navigation, etc., may be determined based on the input sentence.

In addition, the natural language understanding module 120 may analyze a speech act of the input sentence. Speech act analysis is for analyzing an intention of speech, such as whether the user asks a question, makes a request, responds, and/or simply expresses the user's emotions.

The natural language understanding module 120 may classify an intent corresponding to the input sentence and extract an entity required to perform the intent.

For example, if the input sentence is "can you recommend seafood restaurants?", the domain may be a [information retrieval], the intent may be [search information_restaurant]. In the example, the intent is defined as [action_target]. Here, [search information] may be the action, [restaurant] may be the target, and the entity required to perform information retrieval corresponding to such intent may be [seafood], [restaurant].

However, terms used and definitions thereof may vary for each natural language processing device. Accordingly, terms different from an action, a target, and the like, may also be encompassed by a scope of the disclosure, as long as the terms have the same or similar meaning or role in the natural language understanding module.

As described above, an operation of extracting required information such as an intent, a domain, an entity, and the like, from the input sentence by the natural language understanding module 120 may be performed based on rules, machine learning or deep learning, which is described in detail later.

The control module 130 may perform processing on a result of speech recognition and natural language understanding, and output a result processing signal to a chatbot service providing apparatus (e.g. a user terminal, a vehicle), in order to provide a service corresponding to the user intention. For example, the control module 130 may generate and output a control signal for performing an action corresponding to an intent extracted from the user's voice command.

The chatbot service providing apparatus (e.g. a user terminal, a vehicle) may serve as a gateway between a user and the natural language processing device 100. The chatbot service providing apparatus may be a mobile device including an input/output interface such as a microphone, a speaker, a display, and the like, and/or be a telematics device provided in a vehicle.

If the chatbot service providing apparatus is a mobile device (e.g. a smartphone, a laptop), the chatbot service providing apparatus and a vehicle may be connected to each other through wireless communication such as Bluetooth or cable connection.

For example, if a service corresponding to a user intention is a vehicle-related control, the chatbot service providing apparatus may generate a control signal for performing the corresponding control and transmit to the vehicle.

Alternatively or additionally, if a service corresponding to a user intention is provision of specific information, the chatbot service providing apparatus may search for the specific information and transmit the retrieved information to the vehicle. Information retrieval may be performed by an external server, if required.

Alternatively or additionally, if a service corresponding to a user intention is provision of specific content, the chatbot service providing apparatus may request the content from an external server providing the corresponding content.

Alternatively or additionally, if a service corresponding to a user intention is simply continuation of dialogue, the chatbot service providing apparatus may generate a response to the user's speech and output the response as a voice.

The natural language processing device 100 described above may be implemented with at least one memory storing a program performing the aforementioned operations and at least one processor implementing a stored program.

The constituent components of the natural language processing device 100 of FIG. 1 may be divided based on their operation or function, and all or a portion of the constituent components may share the memory or processor. For example, the speech recognition module 110, the natural language understanding module 120 and the control module 130 may not be physically separated from each other.

Figure 2:
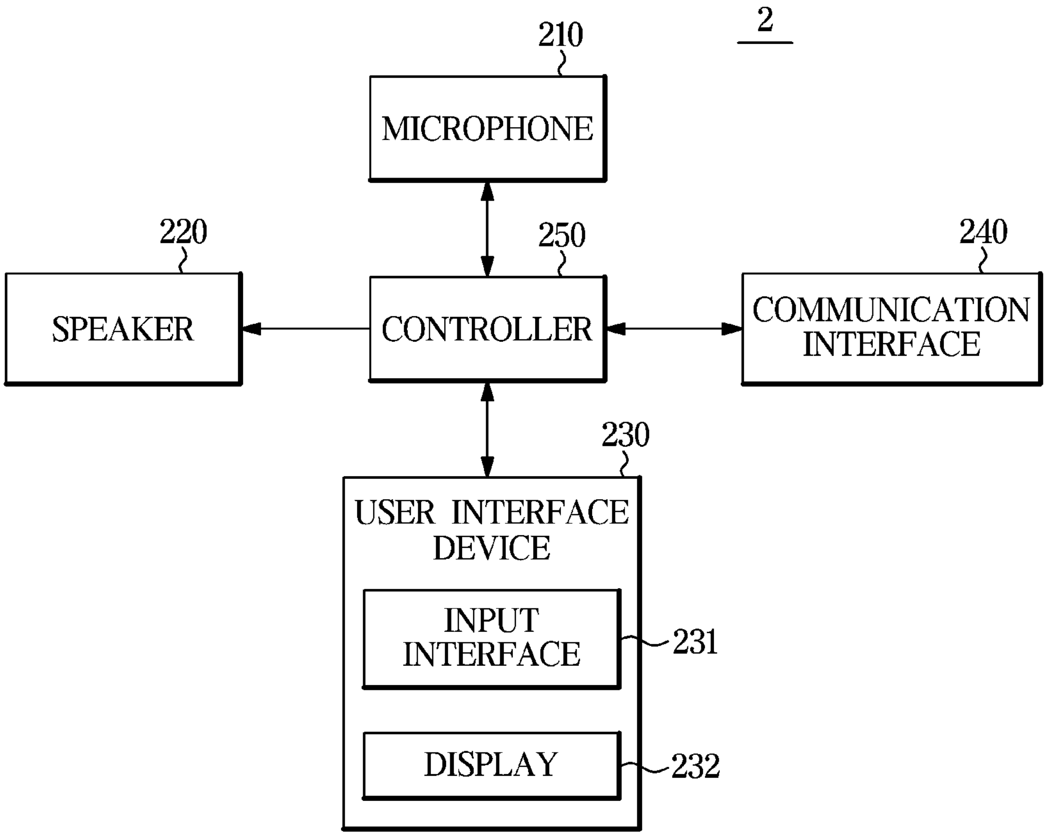
FIG. 2 shows an example of a configuration of a chatbot service providing apparatus.
Figure 3:
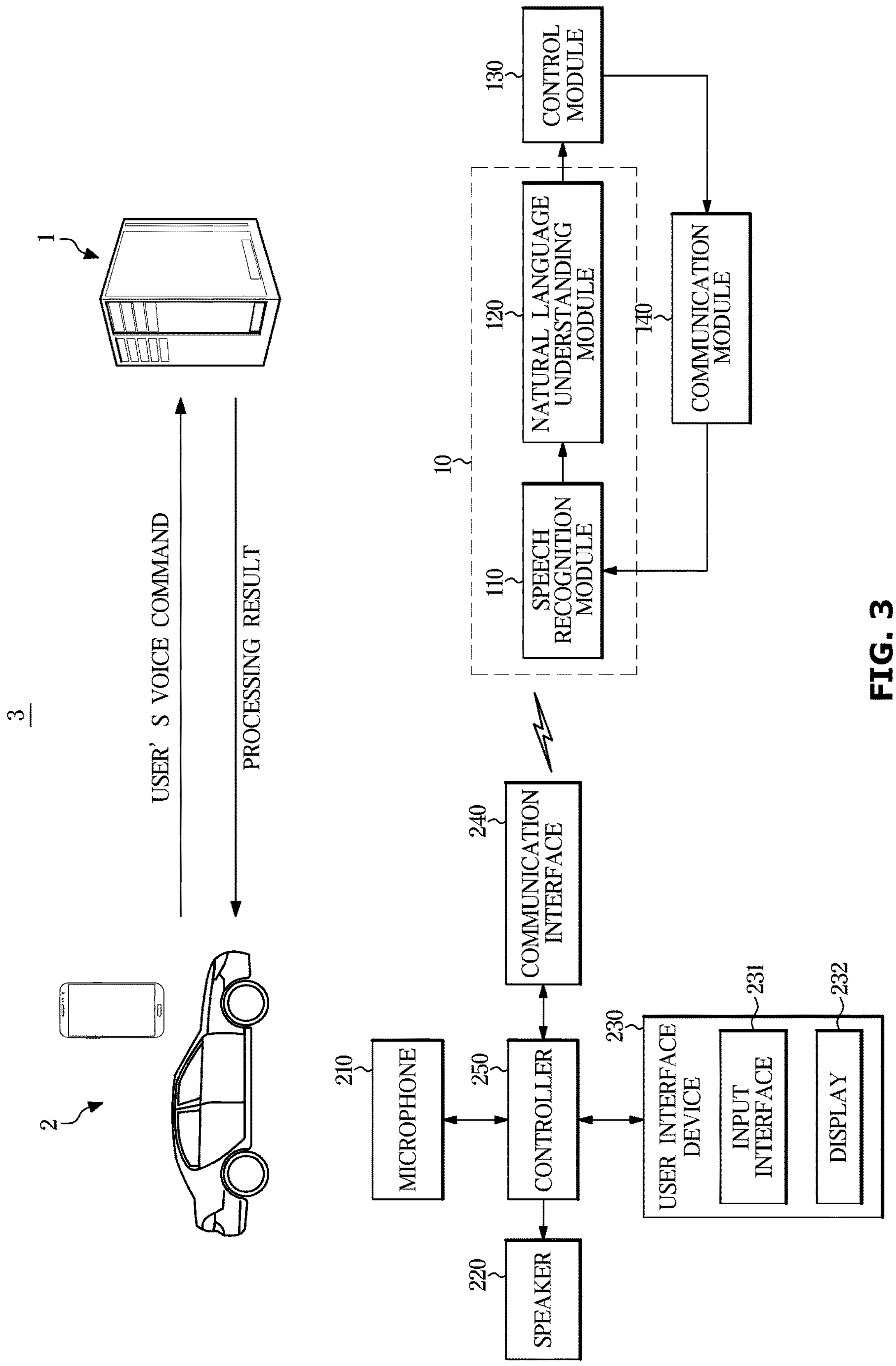
FIG. 3 shows an example of a relationship between a natural language processing device and a chatbot service providing apparatus.

FIG. 2 shows an example of a configuration of a chatbot service providing apparatus. FIG. 3 shows an example of a relationship between a natural language processing device and a chatbot service providing apparatus.

Referring to FIG. 2, a chatbot service providing apparatus 2 may include a microphone 210 to which a user's voice is input, a speaker 220 outputting a sound required to provide a service desired by a user, a user interface device 230 for interacting with the user, a communication interface 240 performing communication with an external device, and/or a controller 250 controlling the above-described constituent components and/or other constituent components of the chatbot service providing apparatus 2.

If the chatbot service providing apparatus 2 is a vehicle, the microphone 210 may be provided inside the vehicle to receive a user's voice.

The microphone 210 may be provided on a steering wheel, a center fascia, a headliner, or a rear-view mirror, and/or the like, to receive the user's voice.

A variety of audios generated around the microphone 210 may be input to the microphone 210 in addition to the user's voice. The microphone 210 may output an audio signal corresponding to the input audio, and the output audio signal may be processed in the controller 250, or be transmitted to the natural language processing device 100 provided in an external server through the communication interface 240.

The user interface device 230 may include an input interface 231 and a display 232 for interacting with the user.

The input interface 231 may convert sensory information (e.g. sound information, tactual information) received from the user into an electrical signal.

Although the microphone 210 is shown as a separate component from the input interface 231, the microphone 210 may be an example of the input interface 231.

The chatbot service providing apparatus 2 may include the input interface 231 for manually receiving a user command, in addition to the microphone 210. The input interface 231 may include at least one input device. If the chatbot service providing apparatus 2 is a vehicle, the input interface 231 may include an input device provided as a jog shuttle or a button, in an area where an audio, video, navigation (AVN) may be provided on a center fascia, in an area where a gearbox is provided, or on a steering wheel.

Also, the input interface 231 may include an input device provided on each door of the vehicle, and an input device provided on a front armrest or a rear armrest.

If the chatbot service providing apparatus 2 is a mobile device, the input interface 231 may include various input devices such as a touch screen, a touch pad, a keyboard, and/or the like.

The display 232 may include a display provided in the chatbot service providing apparatus 2.

If the chatbot service providing apparatus 2 is a vehicle, the display 232 may include an AVN display provided on the center fascia of the vehicle, a cluster display, or a head-up display (HUD). Alternatively or additionally, the display 232 may include a rear seat display provided on a back of the front seat's headrest so that a rear occupant may see the rear seat display. If the chatbot service providing apparatus is a multi-seater vehicle, the display 232 may include a display mounted on a headliner of the vehicle.

The display 232 may be provided anywhere, as long as users of the chatbot service providing apparatus 2 may see the display 232, and the position or the number of displays 232 may not be limited.

The communication interface 240 may exchange a signal with another device by using at least one of various communication methods such as Bluetooth, 4G, 5G, Wi-Fi, and the like. Alternatively or additionally, the communication interface 240 may exchange information with another device through a cable connected to a universal serial bus (USB) terminal, an auxiliary (AUX) terminal, and/or the like.

The communication interface 240 may also exchange a signal and information with two or more other devices by including two or more communication modules supporting communication methods different from each other.

For example, the communication interface 240 may communicate with a mobile device located close to the chatbot service providing apparatus 2 through Bluetooth communication, thereby receiving information (e.g., user images, user speech, contact numbers, schedules, etc.) obtained by or stored in the mobile device. The communication interface 240 may communicate with a server 1 through 4G or 5G communication, thereby transmitting a user's speech and receiving a signal required to provide a service desired by the user.

As another example, the communication interface 240 may communicate with a vehicle located close to the chatbot service providing apparatus 2 through Bluetooth communication, thereby receiving information (e.g., dashboard camera images, etc.) obtained by or stored in the vehicle. The communication interface 240 may communicate with the server 1 through 4G or 5G communication, thereby transmitting a user's speech and receiving a signal required to provide a service desired by the user.

Also, the communication interface 240 may exchange a required signal with the server 1 through external devices connected to the chatbot service providing apparatus 2.

The vehicle may include a navigation device for route guidance, an air conditioning device for adjusting an indoor temperature, a window adjustment device for opening/closing vehicle windows, a seat heating device for heating seats, a seat adjustment device for adjusting a position, height, or angle of a seat, a lighting device for adjusting an indoor illuminance level, a telematics device for searching for information via a wireless network, and/or the like.

The controller 250 may turn on or off the microphone 210, process or store a voice input to the microphone 210, or transmit to another device through the communication interface 240.

Also, the controller 250 may control the display 232 to display an image, and control the speaker 220 to output a sound.

The controller 250 may also perform various controls related to the chatbot service providing apparatus 2. For example, the controller 250 may control at least one of the navigation device, the air conditioning device, the window adjustment device, the seat heating device, the seat adjustment device, the lighting device, the telematics device, and the like, according to a user command input through the input interface 231 and/or the microphone 210.

The controller 250 may include at least one memory storing a program performing the aforementioned operations or operations to be described later and at least one processor implementing a stored program.

According to the example shown in FIG. 3, a chatbot service providing system 3 may include the chatbot service providing apparatus 2 and the server 1.

In an example, the natural language processing device 100 may be provided in the server 1. Accordingly, a user's voice command input to the chatbot service providing apparatus 2 may be transmitted to a communication module 140 of the server 1. If a voice signal is processed in the natural language processing device 100 provided in the server 1, the communication module 140 may transmit a processing result to the chatbot service providing apparatus 2 again.

The communication module 140 may transmit and receive a signal with another device by using at least one of various wireless communication methods such as Bluetooth, 4G, 5G, Wi-Fi, and the like.

All or a portion of the constituent components of the natural language processing device 100 may be provided in the chatbot service providing apparatus 2. For example, the speech recognition module 110 may be provided in the chatbot service providing apparatus 2 and the natural language understanding module 120 and the control module 130 may be provided in the server 1.

As another example, the speech recognition module 110 and the control module 130 may be provided in the chatbot service providing apparatus 2, and the natural language understanding module 120 may be provided in the server 1. The speech recognition module 110 and the natural language understanding module 120 may be provided in the server 1, and the control module 130 may be provided in the chatbot service providing apparatus 2.

As still another example, the natural language processing device 100 may be provided in the chatbot service providing apparatus 2.

According to various examples, the chatbot service providing system 3 may include the chatbot service providing apparatus 2, or include both the chatbot service providing apparatus 2 and the server 1.

Figure 4:
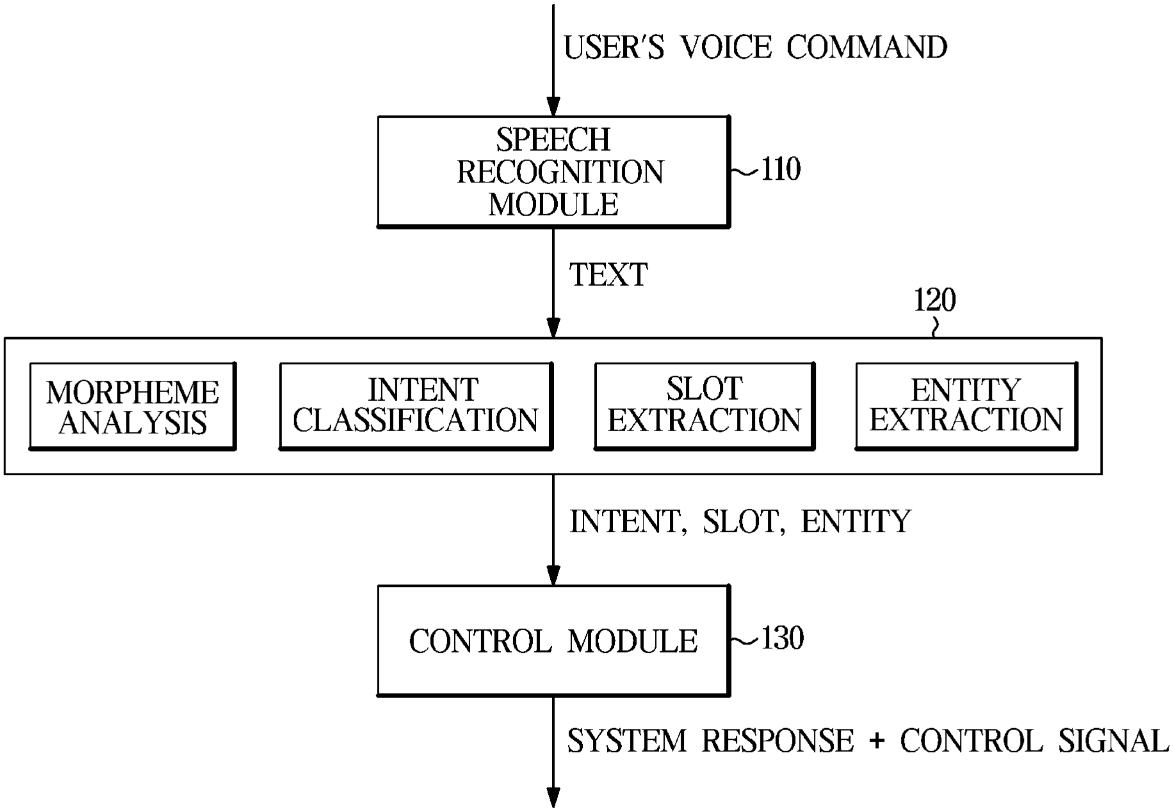
FIG. 4 shows an example of operations performed in each module of a natural language processing device.

FIG. 4 shows an example of operations performed in each module of a natural language processing device.

Referring to FIG. 4, if a user's voice command is input to the speech recognition module 110, the speech recognition module 110 may perform pre-processing such as extraction of voice from the input voice command and noise removal, and then convert a pre-processed voice signal into text.

The text is input to the natural language understanding module 120, and the natural language understanding module 120 may perform morpheme analysis, intent classification, slot extraction, entity extraction, and/or the like, to obtain information required to identify a user intention such as an intent, a slot, and the like.

For natural language analysis, the natural language understanding module 120 may divide an input sentence in units of tokens for analysis. For example, the morpheme analysis may be performed to divide the input sentence into tokens in morpheme units.

According to the morpheme analysis, the input sentence may be separated into morphemes, which are the smallest units of meaning. A morpheme represents the smallest unit in which meaning is analyzable. A morpheme may be a word or a part of a word indicating a grammatical or relational meaning, and may include a root, an ending, a proposition, a prefix, a suffix, and the like of a simple word.

The natural language understanding module 120 may classify an intent corresponding to the user's voice command and extract a slot and entity, by a deep learning model.

An input sequence input to the deep learning model may consist of tokens, and a word embedding vector generated by performing word embedding on the input sequence may be input to an encoding layer. Also, sequence embedding, position embedding, and the like, may be performed together to improve performance.

The encoding layer may encode tokens of the input sequence expressed as a vector. The encoding layer may include a plurality of hidden layers, and use an algorithm such as a recurrent neural network (RNN), a bidirectional gated recurrent units (BiGRU), and/or the like.

The deep learning model may classify an intent based on an output of the encoding layer. For example, an intent corresponding to the input sentence may be classified by comparing a vector of pre-defined intent with the encoded input sequence. In this instance, the input sequence may be matched to the intent by using a softmax function which is one of activation functions used in the classification process.

Also, the deep learning model may extract a slot by using a conditional random field (CRF) layer. Each hidden state of encoding layer may be input to the CRF layer. Alternatively or additionally, a long short-term memory model (LSTM) may be used for slot extraction.

A slot represents meaningful information related to an intent included in a speech. A slot may be defined by a type indicating a classification system to which the value belongs, a role in a sentence, and a value. A plurality of slots may be filled by a plurality of entities.

A role of a slot may be dependent on an intent. For example, in a sentence of "let's go to Busan station from Seoul station", 'Seoul station' and 'Busan station' correspond to the same type of slot. However, in the sentence, their roles are different in that 'Seoul station' is a starting point and 'Busan station' is a destination. Also, 'Seoul station' in a sentence of "let me know an address of Seoul station" and 'Seoul station' in the sentence of "let's go to Busan station from Seoul station" have the same type, but different roles, because a role of 'Seoul station' in the former is a search object.

A type of a slot may be dependent on an intent. For example, in a sentence of "let me know a route to Yanghwa bridge", a type of 'Yanghwa bridge' may correspond to a point of interest (POI), but in a sentence of "play me a song, Yanghwa bridge", a type of 'Yanghwa bridge' may be classified as a song name.

If information such as intent, slot, and the like, corresponding to the voice command is output in the natural language understanding module 120, the control module 130 may generate a result processing signal for performing a function corresponding to the voice command based on the output information such as the intent, the slot, and the like. The result processing signal may include a system response signal including a guide message about a function to be performed, and a control signal required to actually perform the function.

For example, the result processing signal may include a signal for searching for predetermined information.

Figure 5:
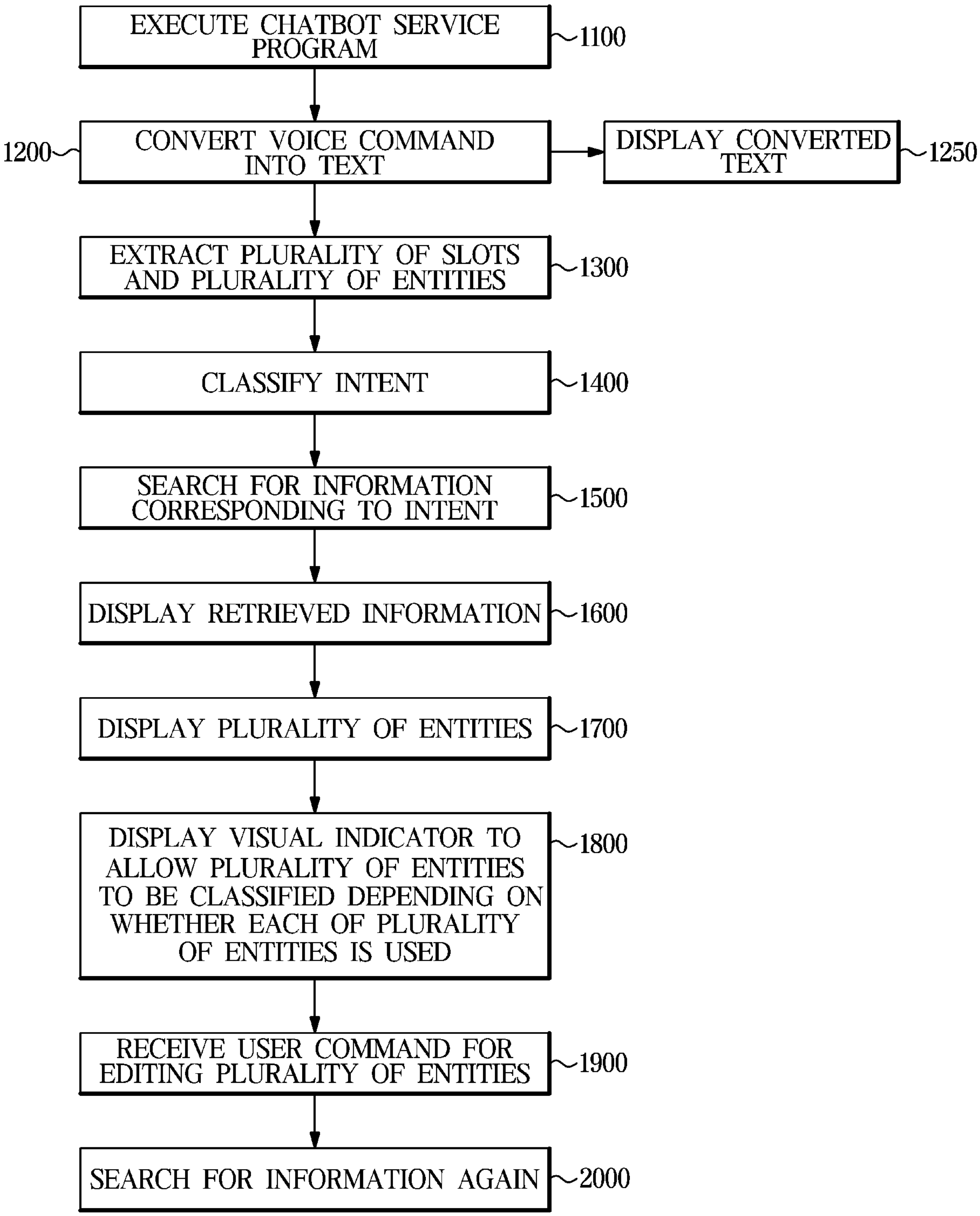
FIG. 5 shows an example of a flowchart showing steps of a chatbot service providing method.

FIG. 5 shows an example of a flowchart showing steps of a chatbot service providing method.

Referring to FIG. 5, a chatbot service program may be executed based on a user input received through the user interface device 230 of the chatbot service providing apparatus 2 (operation 1100).

The chatbot service providing apparatus 2 may execute the chatbot service program in response to receiving the user input for starting the chatbot service program through the user interface device 230.

According to various examples, the display 232 of the chatbot service providing apparatus 2 may provide a graphic user interface (e.g. an icon) for execution of the chatbot service program, and a user may execute the chatbot service program by selecting the graphic user interface for execution of the chatbot service program.

As another example, the microphone 210 of the chatbot service providing apparatus 2 may receive a predetermined voice command for execution of the chatbot service program, and the chatbot service providing apparatus 2 may execute the chatbot service program in response to receiving the predetermined voice command through the microphone 210.

In response to executing the chatbot service program, the chatbot service providing apparatus 2 may provide a user interface for providing a chatbot service through the display 232.

The user interface for providing the chatbot service may include an element for inputting text, an element for inputting a voice command, and the like.

The user interface for providing the chatbot service may also include a window in a form of chat window.

The chatbot service providing apparatus 2 may process the voice command in response to receiving the user's voice command through the microphone 210, and convert the voice command into text in response to processing the voice command (operation 1200).

For example, the chatbot service providing apparatus 2 may convert the voice command into text using the speech recognition module 110.

The chatbot service providing apparatus 2 may display the text converted from the voice command on the display 232 (e.g. a display) (operation 1250).

According to various examples, the user may directly input the text using the input interface 231 which is a typing interface, instead of the voice command.

In this case, conversion in operation 1200 may be omitted, and displaying in operation 1250 may be replaced with displaying the text input by typing.

In the example, the input text may include text converted in response to processing the user's voice command and/or text input by typing.

The chatbot service providing apparatus 2 may extract a plurality of slots and a plurality of entities corresponding to the plurality of slots from the input text, by inputting the input text to the natural language understanding module 120 (operation 1300).

The natural language understanding module 120 may extract the plurality of slots and the plurality of entities corresponding to the plurality of slots in response to processing the input text.

For example, if the input text is "can you recommend Hyundai's camping SUV in the 40 million won (Korean won) range?", a plurality of slots may be (BRAND), (PRICE), (CATEGORY), and (TYPE), and a plurality of entities corresponding to each of the plurality of slots may be [Hyundai], [in the 40 million won range], [camping], and [SUV].

The chatbot service providing apparatus 2 may classify an intent by inputting the input text to the natural language understanding module 120 (operation 1400).

For example, if the input text is "can you recommend Hyundai's camping SUV in the 40 million won range?", a domain may be [vehicle information retrieval], and an intent may be [search information_vehicle].

The chatbot service providing apparatus 2 may search for information corresponding to the intent using at least one of the plurality of entities (operation 1500).

If the input text is "can you recommend Hyundai's camping SUV in the 40 million won range?", the chatbot service providing apparatus 2 may search for information of vehicles using at least one of the plurality of entities, so that the information corresponds to [search information_vehicle].

The chatbot service providing apparatus 2 may search for information through a search engine by using each of the plurality of entities as a keyword of search word.

For example, the chatbot service providing apparatus 2 may search for information through a search engine by using [Hyundai], [in the 40 million won range], [camping] and [SUV] as a keyword.

Each of the plurality of entities may create a search formula through a predetermined logical operator.

The chatbot service providing apparatus 2 may create a search formula using the plurality of entities and the predetermined logical operator, and search for information through a search engine using the search formula.

The logical operator may include an AND operator, an OR operator, and/or a NOT operator.

The chatbot service providing apparatus 2 may create the search formula by connecting each of the plurality of entities with the predetermined logical operator.

According to various examples, the chatbot service providing apparatus 2 may create the search formula by combining all of the plurality of entities with the AND operator, combining a portion of the plurality of entities with the OR operator, or separating a portion of the plurality of entities with the NOT operator.

The AND operator is an operator for searching for results including all the keywords combined with the AND operator, the OR operator is an operator for searching for results including at least one of keywords combined with the OR operator, and the NOT operator is an operator for searching for results that does not include a keyword separated by the NOT operator.

According to various examples, the chatbot service providing apparatus 2 may search for information corresponding to the intent using all of the plurality of entities and identify the number of search results, as an initial stage.

For example, the chatbot service providing apparatus 2 may search for information through a search formula {Hyundai and 40 million won and camping and SUV} and identify the number of search results.

If the number of search results in the initial stage is greater than a predetermined value, it may be determined that valid information is insufficient.

If the number of search results in the initial stage is less than the predetermined value, the chatbot service providing apparatus 2 may search for information corresponding to the intent by excluding at least one of the plurality of entities.

That is, if the number of search results in the initial stage is less than the predetermined value, the chatbot service providing apparatus 2 may search for information corresponding to the intent by using only a portion of the plurality of entities.

According to various examples, if searching for information corresponding to the intent by using only a portion of the plurality of entities, the chatbot service providing apparatus 2 may determine priorities of the plurality of entities based on an order of input text.

For instance, a higher priority may be assigned to an entity positioned earlier in an input text.

For example, if the input text is "can you recommend Hyundai's camping SUV in the 40 million won range?", the chatbot service providing apparatus 2 may assign a highest priority to an entity of [in the 40 million won range].

In an example, the chatbot service providing apparatus 2 may search for information corresponding to the intent by necessarily using an entity having a highest priority among the plurality of entities, and excluding at least one of the other entities.

For example, if the input text is "can you recommend Hyundai's camping SUV in the 40 million won range?", the chatbot service providing apparatus 2 may search for information through a search formula of (40 million won and Hyundai and camping).

According to various examples, the chatbot service providing apparatus 2 may search for information corresponding to the intent by excluding an entity with the lowest number of hits for search result.

For example, if a difference between the number of search results obtained if searching for information through a first search formula like (40 million won and Hyundai and camping and SUV) and the number of search results obtained if searching for information through a second search formula like (40 million won and Hyundai and SUV) is large, the chatbot service providing apparatus 2 may exclude the entity which is included in the first search formula but not included in the second search formula.

According to the disclosure, a user may obtain a desired response by first making an utterance or typing an element that the user considers most important in the user's request.

The chatbot service providing apparatus 2 may display the information retrieved by using at least one of the plurality of entities on the display 232 (operation 1600).

In an example, the chatbot service providing apparatus 2 may display the plurality of entities on the display 232 (operation 1700).

Displaying the plurality of entities on the display 232 may include outputting a plurality of texts corresponding to the plurality of entities.

For example, if the plurality of entities are [Hyundai], [in the 40 million won range], [camping], and [SUV], displaying the plurality of entities on the display 232 may include outputting the texts, i.e. [Hyundai], [in the 40 million won range], [camping], [SUV], on the display 232.

Also, displaying the plurality of entities on the display 232 may be performed separately from displaying the input text (operation 1250).

That is, the chatbot service providing apparatus 2 may simultaneously display the input text, separately from the texts, [Hyundai], [in the 40 million won range], [camping], [SUV], on the display 232.

Displaying the input text on the display 232 may include displaying the input text within a speech balloon, and displaying the plurality of entities on the display 232 may include displaying texts corresponding to the plurality of entities separately from a speech balloon.

According to various examples, the chatbot service providing apparatus 2 may display a visual indicator for distinguishing the plurality of entities from each other based on usability of the plurality of entities on the display 232.

The chatbot service providing apparatus 2 may display the visual indicator (e.g., visual effect) on the display to classify the plurality of entities depending on whether each of the plurality of entities is used (operation 1800).

The usability of the plurality of entities may refer to whether the plurality of entities have been used to search for information corresponding to the intent.

For example, the plurality of entities may be classified into (A), (B) and/or (C) as shown below.

(A) a first entity used in searching for information (B) a second entity unused (e.g., excluded) in searching for information (C) a third entity implicitly used in searching for information The chatbot service providing apparatus 2 may control the display 232 to distinguish a group classified as the first entity, a group classified as the second entity, and a group classified as the third entity from among the plurality of entities displayed on the display 232.

The chatbot service providing apparatus 2 may provide a user interface capable of editing the plurality of entities displayed on the display 232.

In an example, the chatbot service providing apparatus 2 may receive a user command for editing the plurality of entities displayed on the display 232 through the input interface 231 and/or the microphone 210 (operation 1900).

In an example, the chatbot service providing apparatus 2 may search for predetermined information again based on the plurality of entities edited, and display the re-searched information (operation 2000).

An example of the chatbot service providing method performed by the chatbot service providing apparatus 2 has been described above.

According to various examples, the above-described chatbot service providing method may be performed by the chatbot service providing system 3. The chatbot service providing system 3 may include at least one memory storing at least one instruction for performing the aforementioned method, and at least one processor executing the instruction stored in the at least one memory.

The at least one memory and the at least one processor may be included in a single configuration (e.g. the chatbot service providing apparatus 2), or included in a plurality of configurations (e.g. the chatbot service providing apparatus 2, the server 1).

Hereinafter, various examples of the chatbot service providing method are described in greater detail.

Figure 6:
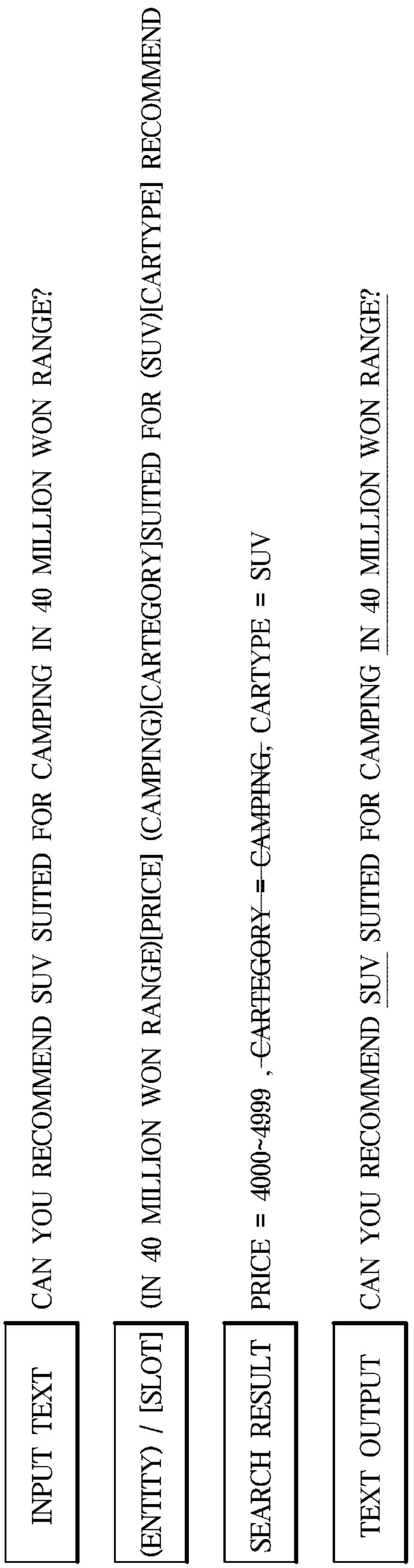
FIG. 6 shows an example of a plurality of slots and a plurality of entities.

FIG. 6 shows an example of a plurality of slots and a plurality of entities.

Referring to FIG. 6, the chatbot service providing apparatus 2 may identify an input text. As described above, the input text may include a text converted from a user's voice command by the speech recognition module 110, or a text typed by a user.

For example, the input text may be "can you recommend SUV suited for camping in the 40 million won (Korean won) range?".

The chatbot service providing apparatus 2 may extract a plurality of slots and a plurality of entities corresponding to the plurality of slots, in response to processing the input text.

For example, the plurality of slots may be [PRICE], [CATEGORY], and [CARTYPE], and the plurality of entities may be (in the 40 million won range) corresponding to [PRICE], (camping) corresponding to [CATEGORY], and (SUV) corresponding to [CARTYPE].

The chatbot service providing apparatus 2 may classify an intent of the input text in response to processing the input text. For example, the intent of the input text may be classified as 'vehicle search'.

The chatbot service providing apparatus 2 may search for information corresponding to the intent using at least one of the plurality of entities.

For example, the chatbot service providing apparatus 2 may search for information corresponding to 'vehicle' using remaining entities except for (camping) among the plurality of entities.

The chatbot service providing apparatus 2 may display the input text on the display 232.

According to various examples, the chatbot service providing apparatus 2 may display entities used in the input text displayed on the display 232 to be distinguished.

For example, in response to searching for information corresponding to 'vehicle' using the remaining entities except for (camping) among the plurality of entities, the chatbot service providing apparatus 2 may provide a visual effect (e.g. underline) to distinguish the entity of (camping) from the entities of (in the 40 million won range) and (SUV).

The visual effect may be implemented in various forms. For example, visual effects such as underline, font, font thickness, highlight, parenthesis, and the like, may be implemented.

According to the disclosure, a user may confirm which element is missing from a chatbot's response intended by the user.

Figure 7:
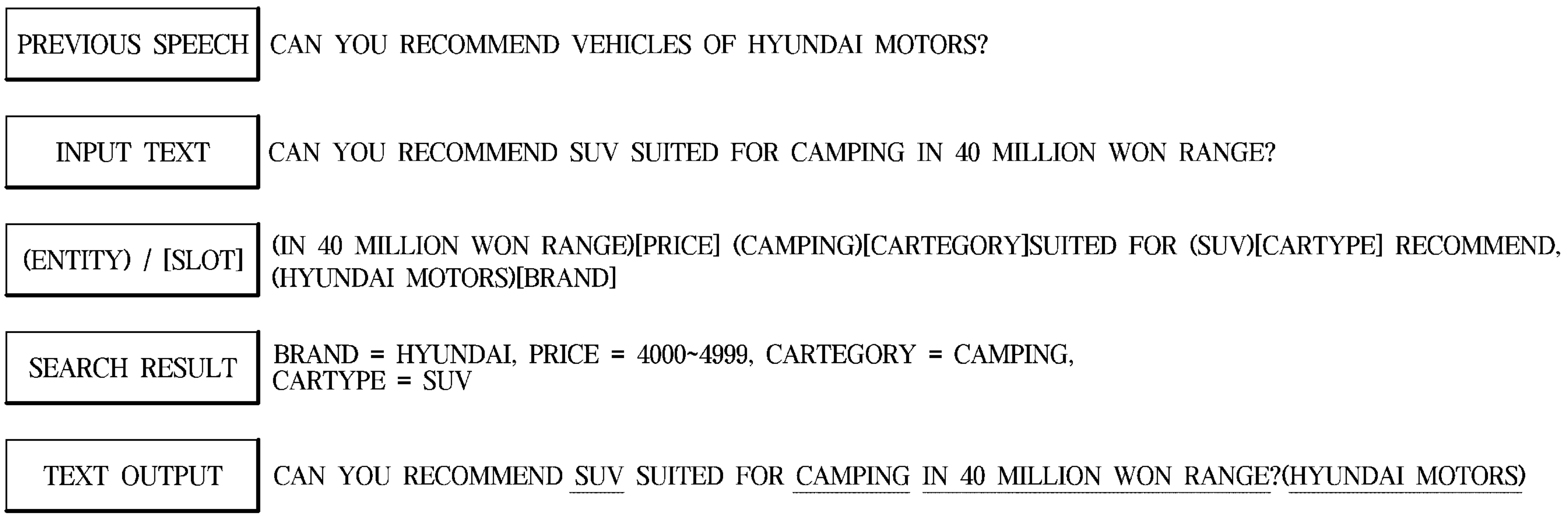
FIG. 7 shows an example where entities included in previous input text are used for information retrieval.

FIG. 7 shows an example where entities included in previous input text are used for information retrieval.

According to various examples, the chatbot service providing apparatus 2 may add an entity based on past historical data.

That is, the chatbot service providing apparatus 2 may add and utilize a previous entity extracted in response to processing a previous input text to a plurality of entities extracted in response to processing a current input text.

Referring to FIG. 7, the chatbot service providing apparatus 2 may add an entity in a chatbot service based on a user's previous speech history.

The input text shown in FIG. 7 is identical to the input text shown in FIG. 6.

In FIG. 7, however, a text "can you recommend vehicles of Hyundai motors?" is used as the previous input text by the chatbot service providing apparatus 2.

The chatbot service providing apparatus 2 may utilize the entity of "Hyundai motors" extracted in response to processing the previous input text, as a plurality of entities for searching for information corresponding to an intent.

The chatbot service providing apparatus 2 may display the input text on the display 232.

According to various examples, the chatbot service providing apparatus 2 may display entities used in the input text displayed on the display 232 to be distinguished.

For example, in response to searching for information corresponding to 'vehicle' using remaining entities except for (camping) among a plurality of entities, the chatbot service providing apparatus 2 may provide a visual effect (e.g. underline) to distinguish the entity of (camping) from the entities of (in the 40 million won range) and (SUV).

As another example, the chatbot service providing apparatus 2 may provide a visual effect to distinguish the entity of (Hyundai motors) which is not included in the current input text from the entities of (in the 40 million won range) and (SUV) among the plurality of entities.

The visual effect may be implemented in various forms. For example, visual effects such as underline, font, font thickness, highlight, parenthesis, and the like, may be implemented.

Figure 8:
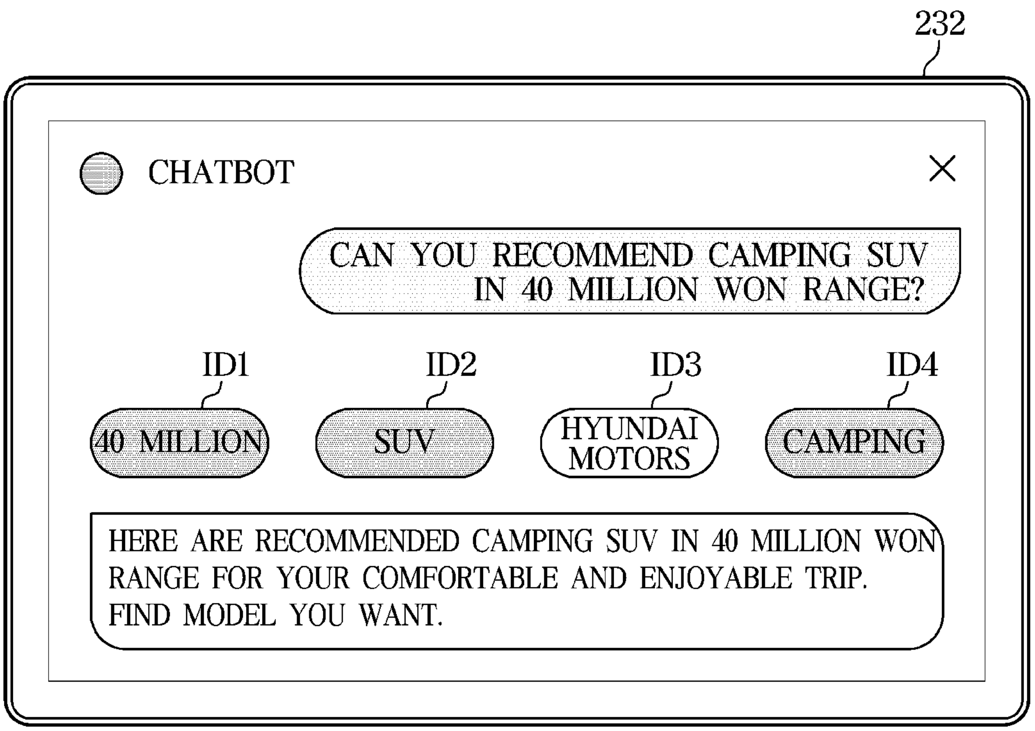
FIG. 8 shows an example of a plurality of entities displayed on a display.

FIG. 8 shows an example of a plurality of entities displayed on a display.

Referring to FIG. 8, the chatbot service providing apparatus 2 may display an input text on the display 232.

By displaying the input text on the display 232, a user may confirm whether a text typed by the user and/or a voice command of the user has been accurately delivered to the chatbot service providing apparatus 2.

The chatbot service providing apparatus 2 may display a plurality of entities ID1, ID2, ID3, and ID4. According to various examples, the plurality of entities ID1, ID2, ID3, and ID4 may include the entities ID1, ID2, and ID4, which are extracted in response to processing the input text, as well as the entity ID3 extracted in response to processing a previous input text.

As described above, the chatbot service providing apparatus 2 may display a visual indicator for distinguishing the plurality of entities ID1, ID2, ID3, and ID4 from each other, based on usability of the plurality of entities ID1, ID2, ID3, and ID4, on the display 232.

In an example, the chatbot service providing apparatus 2 may display the first entities ID1, ID2, and ID4 used in searching for information and the second entity ID3 unused in searching for information among the plurality of entities ID1, ID2, ID3, and ID4 to be distinguished from each other.

That is, the plurality of entities ID1, ID2, ID3, and ID4 may be distinguished and displayed depending on whether each of the plurality of entities ID1, ID2, ID3, and ID4 is used.

Assuming that the input text is "can you recommend camping SUVs in the 40 million won range?" and entities used for vehicle search are 'in the 40 million won range (ID1)', 'SUV (ID2)' and 'camping (ID4)', the chatbot service providing apparatus 2 may display 'in the 40 million won range (ID1)', 'SUV (ID2)' and 'camping (ID4)' to be distinguished from 'Hyundai motors (ID3)'.

For example, the chatbot service providing apparatus 2 may provide a first visual effect to the first entities ID1, ID2, and ID4 used in search, and a second visual effect to the second entity ID3 unused in search. The first visual effect is different from the second visual effect.

According to the disclosure, a user may identify an entity actually used in search, and thus the user experience may be improved.

Figure 9:
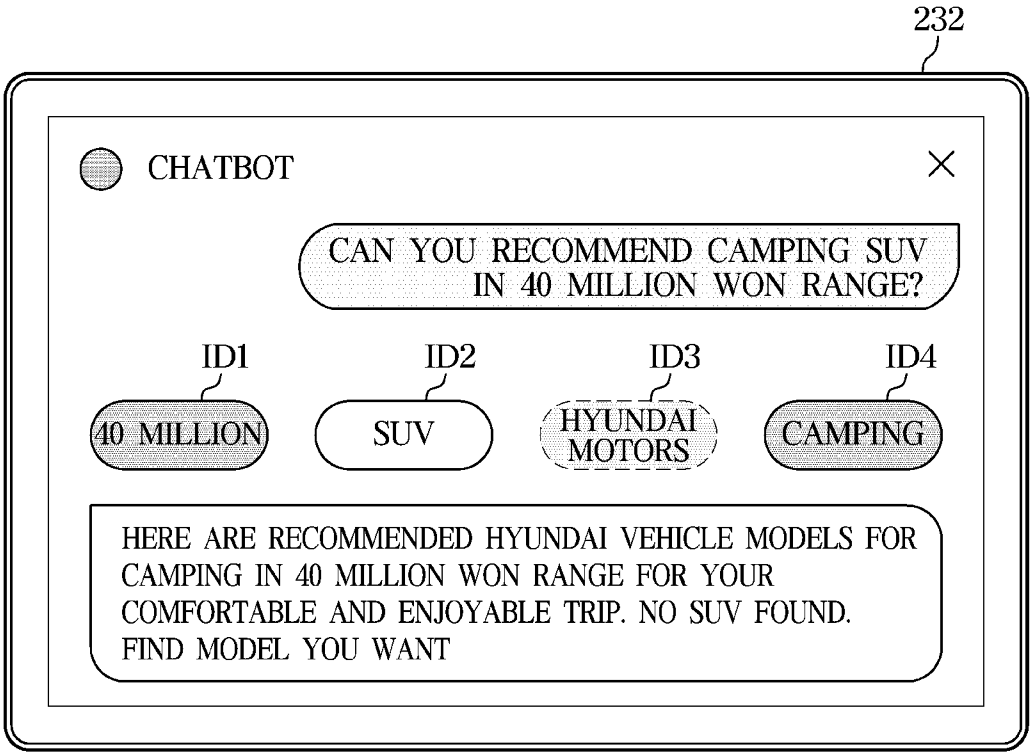
FIG. 9 shows an example of a plurality of entities displayed on a display.

FIG. 9 shows an example of a plurality of entities displayed on a display.

Referring to FIG. 9, the chatbot service providing apparatus 2 may display a plurality of entities ID1, ID2, ID3, and ID4.

As described above, the plurality of entities ID1, ID2, ID3, and ID4 may include the entities ID1, ID2, and ID4, which are extracted in response to processing an input text, as well as the entity ID3 extracted in response to processing a previous input text.

The plurality of entities ID1, ID2, ID3, and ID4 may be distinguished and displayed depending on whether each of the plurality of entities ID1, ID2, ID3, and ID4 is used.

In an example, the chatbot service providing apparatus 2 may display the first entities ID1 and ID4 used in searching for information, the second entity ID2 unused in searching for information, and the third entity ID3 implicitly used in searching for information among the plurality of entities ID1, ID2, ID3, and ID4 to be distinguished from each other.

Assuming that the input text is "can you recommend camping SUVs in the 40 million won range?", entities used for vehicle search are 'in the 40 million won range (ID1)', and 'camping (ID4)', and the entity implicitly used according to past history is 'Hyundai motors (ID3)', the chatbot service providing apparatus 2 may display 'in the 40 million won range (ID1)' and 'camping (ID4)' to be distinguished from 'SUV (ID2)' and 'Hyundai motors (ID3)'. Also, the chatbot service providing apparatus 2 may display 'SUV (ID2)' to be distinguished from 'Hyundai motors (ID3)'.

For example, the chatbot service providing apparatus 2 may provide a first visual effect to the first entities ID1 and ID4 used in search, a second visual effect to the second entity ID2 unused in search, and a third visual effect to the third entity ID3 implicitly used in search. Here, the first visual effect, the second visual effect, and the third visual effect are different from each other.

According to the disclosure, a user may identify an entity actually used in search, and thus the user experience may be improved.

Figure 10:
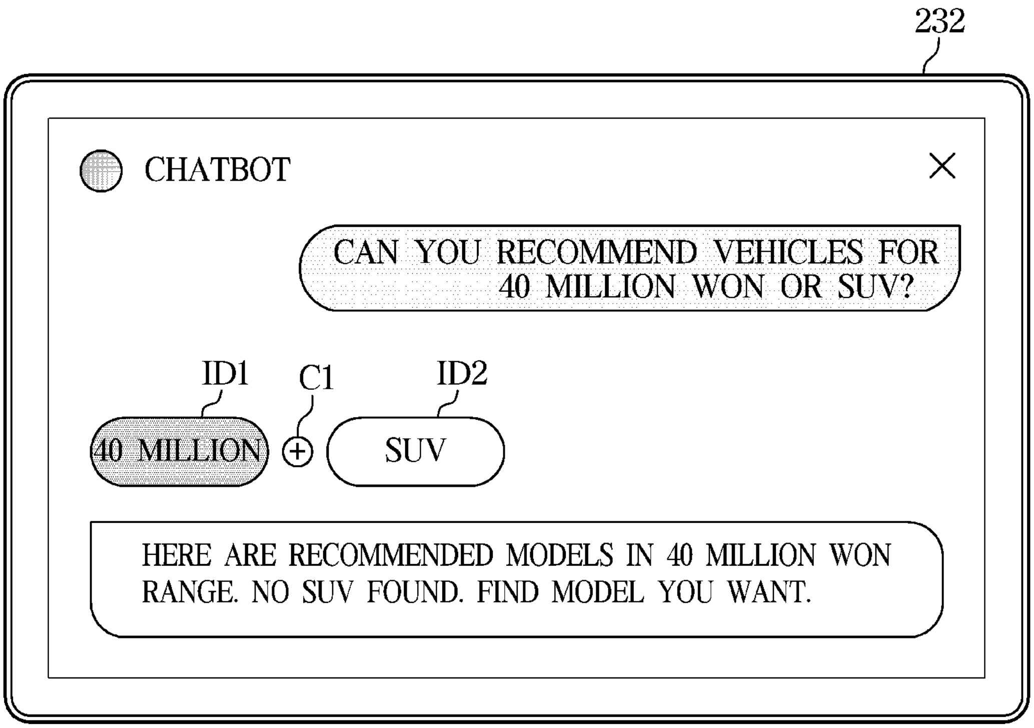
FIG. 10 shows an example where a logical operator used if searching for information with a plurality of entities is displayed on a display.

FIG. 10 shows an example where a logical operator used if searching for information with a plurality of entities is displayed on a display.

Referring to FIG. 10, the chatbot service providing apparatus 2 may display a logical operator corresponding to an intent and used in search process on the display 232. Displaying the logical operator on the display 232 may include displaying a visual mark C1 corresponding to the logical operator on the display 232.

As described above, the logical operator for creating a search formula may include an AND operator, an OR operator, and/or a NOT operator.

For example, if the input text is "can you recommend vehicles in the 40 million won or an SUV?", the chatbot service providing apparatus 2 may create a search formula by combining an entity ID1 of (in the 40 million won range) and an entity ID2 of (SUV) with the OR operator.

According to various examples, the logical operator for creating the search formula may be displayed as a predetermined visual mark on the display 232.

Through combination of the above-described examples, the chatbot service providing apparatus 2 may also provide a visual indicator for distinguishing which one has been used from among the entity ID1 of (in the 40 million won range) and the entity ID2 of (SUV).

According to the disclosure, a user may easily identify a search condition for searching for predetermined information.

Figure 11:
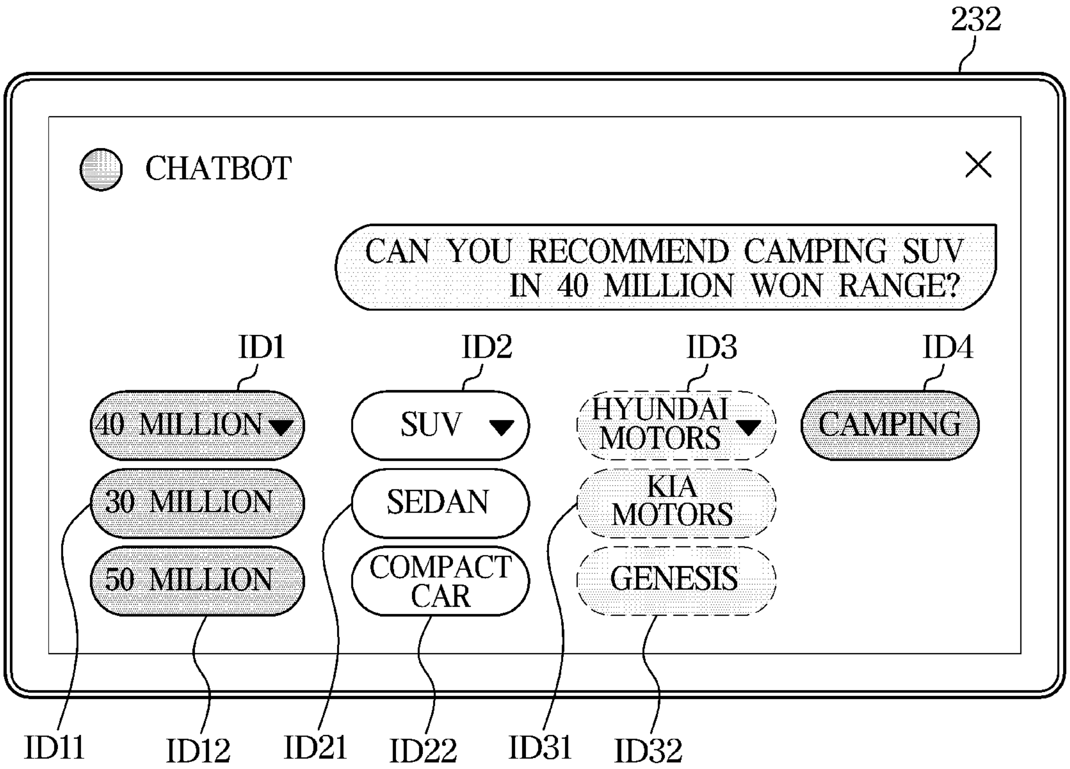
FIG. 11 shows an example of a user interface to edit a plurality of entities.

FIG. 11 shows an example of a user interface to edit a plurality of entities.

The chatbot service providing apparatus 2 may provide a user interface for editing a plurality of entities.

For example, the chatbot service providing apparatus 2 may display an interface element on the display 232. Here, the interface element is for receiving a user input for editing the plurality of entities.

A user may edit the plurality of entities displayed on the display 232 through the input interface 231.

The chatbot service providing apparatus 2 may receive the user input for editing the plurality of entities, and search for information corresponding to an intent again based on the plurality of entities edited according to the user input.

Referring to FIG. 11, the chatbot service providing apparatus 2 may display at least one entity ID11, ID12, ID21, ID22, ID31 and ID32 that may replace predetermined entities ID1, ID2 and ID3 among the plurality of entities ID1, ID2, ID3 and ID4 displayed on the display 232.

The at least one entity ID11, ID12, ID21, ID22, ID31 and ID32 that may replace the predetermined entities ID1, ID2 and ID3 may be in a similar search word relationship with the predetermined entity ID1.

The similar search word relationship may refer to words provided as similar search words if a predetermined word is entered as a keyword in a search engine.

For example, the at least one entity ID11 and ID12 that may replace the entity ID1 of "40 million won" may be "30 million won" and/or "50 million won".

As another example, the at least one entity ID21 and ID22 that may replace the entity ID2 of "SUV" may be "sedan" and/or "compact car".

As still another example, the at least one entity ID31 and ID32 that may replace the entity ID3 of "Hyundai motors" may be "Kia motors" and/or "Genesis".

A user may modify the plurality of entities by selecting the at least one replaceable entity ID11, ID12, ID21, ID22, ID31 and ID32 through the input interface 231.

In response to selecting the at least one replaceable entity ID11, ID12, ID21, ID22, ID31 and ID32, the chatbot service providing apparatus 2 may search for information corresponding to an intent again based on the newly selected plurality of entities.

Figure 12:
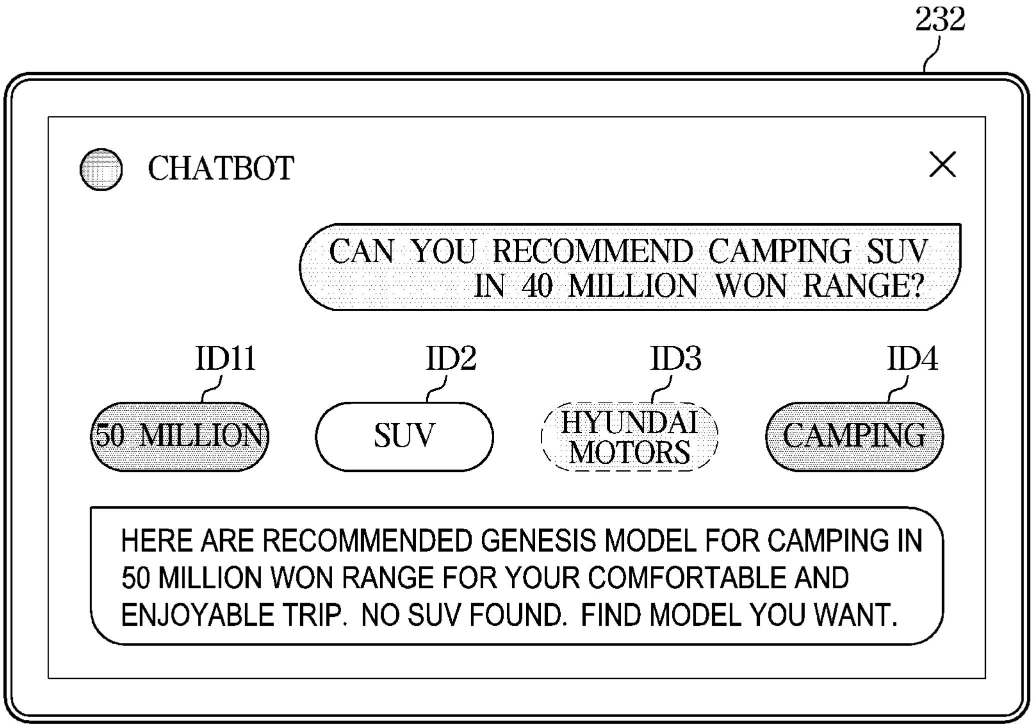
FIG. 12 shows an example where a result of search performed based on a plurality of entities edited according to a user input is displayed on a display.

FIG. 12 shows an example where a result of search performed based on a plurality of entities edited according to a user input is displayed on a display.

Referring to FIG. 12, in response to selecting an entity ID11 of "50 million won", that may replace the entity ID1 of "40 million won", from among at least one replaceable entity ID11, ID12, ID21, ID22, ID31 and ID32, the chatbot service providing apparatus 2 may search for information corresponding to an intent again based on the entity ID11 of "50 million won".

According to various examples, the chatbot service providing apparatus 2 may assign a highest priority to the entity ID11 newly selected according to the user input.

According to the disclosure, a user may easily use a chatbot by modifying a portion of entities that have been already used to obtain a chatbot's response desired by the user.

Figure 13:
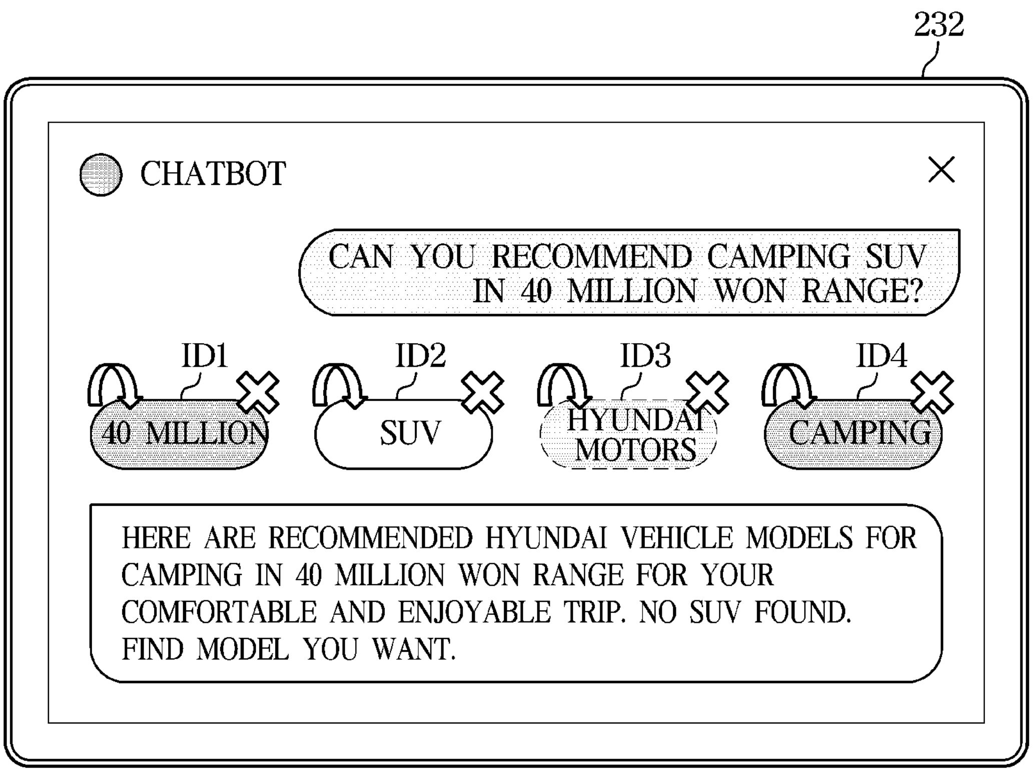
FIG. 13 shows an example of a user input to edit a plurality of entities.

FIG. 13 shows an example of a user input to edit a plurality of entities.

Referring to FIG. 13, a user input for editing a plurality of entities may include a user input for deleting a portion of the plurality of entities and a user input for modifying a portion of the plurality of entities.

A user may modify or delete an entity to edit through the input interface 231.

For example, the user may be provided with information about at least one entity ID11, ID12, ID21, ID22, ID31 and ID32, that may replace predetermined entities ID1, ID2 and ID3, by touching areas where the predetermined entities ID1, ID2 and ID3 are displayed for a predetermined period of time.

That is, in response to selecting the predetermined entities ID1, ID2 and ID3 for the predetermined period of time through the input interface 231, the chatbot service providing apparatus 2 may provide information about the at least one entity ID11, ID12, ID21, ID22, ID31 and ID32 that may replace the predetermined entities ID1, ID2 and ID3.

In FIG. 12, illustrated is an example of an interface providing information about the at least one entity ID11, ID12, ID21, ID22, ID31 and ID32 that may replace the predetermined entities ID1, ID2 and ID3.

As another example, a user may delete the predetermined entities ID1, ID2 and ID3 by touching a delete button corresponding to areas where the predetermined entities ID1, ID2 and ID3 are displayed.

The delete button corresponding to areas where the predetermined entities ID1, ID2 and ID3 are displayed may be an X mark, without being limited thereto.

According to various examples, the user may set priorities of the plurality of entities through the input interface 231.

For example, the user may change the priorities of the plurality of entities ID1, ID2, ID3 and ID4 by dragging and repositioning an entity whose priority is to be changed through the input interface 231.

That is, the user may change the priorities of the plurality of entities by repositioning the plurality of entities ID1, ID2, ID3 and ID4.

By dragging the entity ID1 of "40 million won" and repositioning between the entity ID2 corresponding to "SUV" and the entity ID3 corresponding to "Hyundai motors", the priorities of the plurality of entities may be changed from ID1, ID2, ID3 and ID4 to ID2, ID1, ID3 and ID4.

According to the disclosure, the user may change a user's request by referring to the plurality of entities ID1, ID2, ID3 and ID4.

Figure 14:
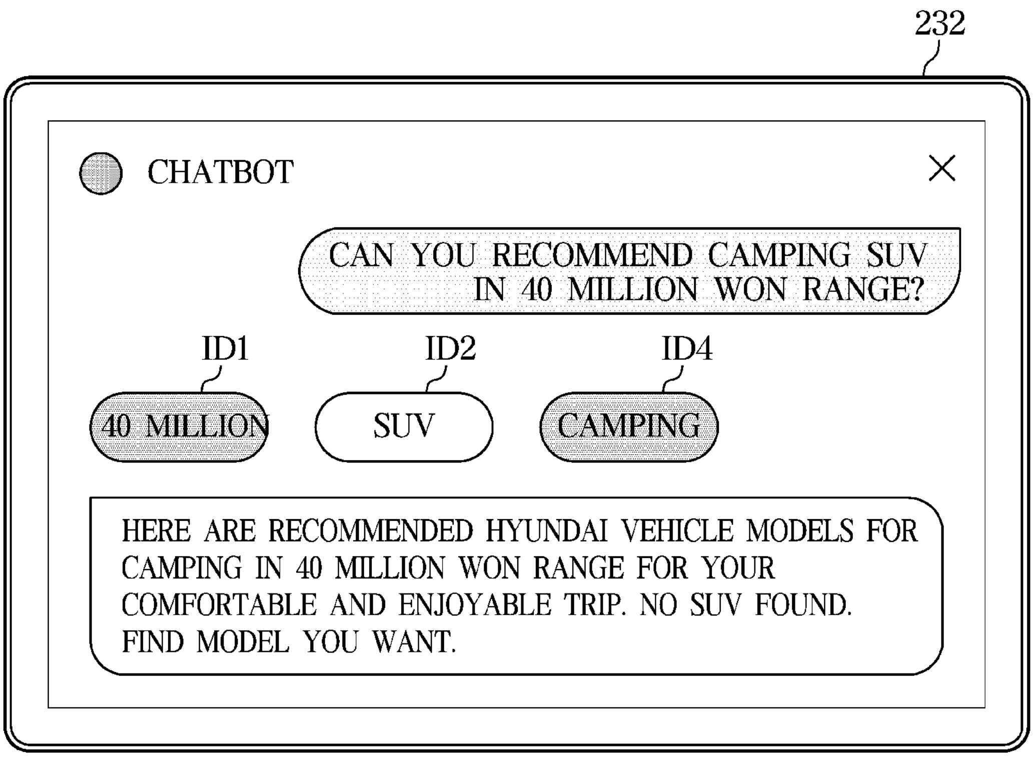
FIG. 14 shows an example where one of a plurality of entities is deleted based on a user input.

FIG. 14 shows an example where one of a plurality of entities is deleted based on a user input.

Referring to FIG. 14, a user may delete any one entity ID3 from a plurality of entities ID1, ID2, ID3 and ID4 through the input interface 231.

The chatbot service providing apparatus 2 may search for information corresponding to an intent again based on remaining entities ID1, ID2 and ID4 except for the deleted entity ID3.

An example of the disclosure provides a chatbot service providing method and a chatbot service providing system that may distinguish an entity used in a response of a chatbot service from an entity unused in the response.

An example of the disclosure provides a chatbot service providing method and a chatbot service providing system that may determine priorities of entities based on order of speeches.

An example of the disclosure provides a chatbot service providing method and a chatbot service providing system that may modify an entity to be used in a response according to a user intention.

Additional examples of the disclosure will be set forth in part in the description which follows and, in part, will be obvious from the description, or may be learned by practice of the disclosure.

According to an example of the disclosure, a chatbot service providing method may include: extracting a plurality of slots and a plurality of entities corresponding to the plurality of slots in response to processing an input text; classifying an intent in response to processing the input text; searching for information corresponding to the intent using at least one of the plurality of entities; displaying the searched information on a display; displaying the plurality of entities on the display; and displaying a visual indicator for distinguishing the plurality of entities from each other based on usability of the plurality of entities on the display.

The searching for of the information corresponding to the intent using the at least one of the plurality of entities may include: determining priorities of the plurality of entities according to an order of the input text; and searching for the information corresponding to the intent based on the priorities.

The searching for of the information corresponding to the intent based on the priorities may include: searching for the information corresponding to the intent by basically using an entity having a highest priority among the plurality of entities and excluding at least one of remaining entities.

The chatbot service providing method may further include: displaying the input text on the display, and the displaying of the plurality of entities on the display may include displaying a plurality of texts corresponding to the plurality of entities on the display, separately from the input text displayed on the display.

The displaying of the visual indicator on the display may include displaying the visual indicator for distinguishing a first entity used in searching for the information corresponding to the intent from a second entity not used in searching for the information corresponding to the intent, among the plurality of entities displayed on the display.

The searching for of the information corresponding to the intent using the at least one of the plurality of entities may include utilizing a previous entity extracted in response to processing a previous input text as the plurality of entities.

The displaying of the visual indicator on the display may include displaying the visual indicator for distinguishing a first entity used in searching for the information corresponding to the intent, a second entity not used in searching for the information corresponding to the intent, and the previous entity, among the plurality of entities displayed on the display.

The displaying of the plurality of entities on the display may further include displaying a logical operator used in searching for the information corresponding to the intent using the at least one of the plurality of entities on the display.

The chatbot service providing method may further include: receiving a user input for editing the plurality of entities; and searching for the information corresponding to the intent again based on the plurality of entities edited according to the user input.

The user input for editing the plurality of entities may include at least one of a first user input for deleting at least one of the plurality of entities, a second user input for modifying at least one of the plurality of entities to another entity, or a third user input for changing the priorities of the plurality of entities by repositioning the plurality of entities.

According to an example of the disclosure, in a chatbot service providing system including at least one processor and a memory storing at least one instruction for providing a chatbot service, the at least one processor during execution of the at least one instruction stored in the memory may be configured to perform: extracting a plurality of slots and a plurality of entities corresponding to the plurality of slots in response to processing an input text; classifying an intent in response to processing the input text; searching for information corresponding to the intent using at least one of the plurality of entities; displaying the searched information on a display; displaying the plurality of entities on the display; and displaying a visual indicator for distinguishing the plurality of entities from each other based on usability of the plurality of entities on the display.

The at least one processor may be configured to perform: determining priorities of the plurality of entities according to an order of the input text; and searching for the information corresponding to the intent based on the priorities.

The at least one processor may be configured to perform: searching for the information corresponding to the intent by basically using an entity having a highest priority among the plurality of entities and excluding at least one of remaining entities.

The at least one processor may be configured to perform: displaying the input text on the display; and displaying a plurality of texts corresponding to the plurality of entities on the display, separately from the input text displayed on the display.

The at least one processor may be configured to perform: displaying the visual indicator for distinguishing a first entity used in searching for the information corresponding to the intent from a second entity not used in searching for the information corresponding to the intent, among the plurality of entities displayed on the display.

The at least one processor may be configured to perform utilizing a previous entity extracted in response to processing a previous input text as the plurality of entities.

The at least one processor may be configured to perform displaying the visual indicator for distinguishing a first entity used in searching for the information corresponding to the intent, a second entity not used in searching for the information corresponding to the intent, and the previous entity, among the plurality of entities displayed on the display.

The at least one processor may be configured to perform displaying a logical operator used in searching for the information corresponding to the intent using the at least one of the plurality of entities on the display.

The at least one processor may be configured to perform: receiving a user input for editing the plurality of entities; and searching for the information corresponding to the intent again based on the plurality of entities edited according to the user input.

The user input for editing the plurality of entities may include at least one of a first user input for deleting at least one of the plurality of entities, a second user input for modifying at least one of the plurality of entities to another entity, or a third user input for changing the priorities of the plurality of entities by repositioning the plurality of entities.

The above examples of the chatbot service providing method and chatbot service providing system are not limited thereto, and the above-described examples are exemplary in all respects. Accordingly, those skilled in the art will appreciate that various modifications, additions and substitutions are possible, without departing from the scope and spirit of the disclosure. Therefore, examples have not been described for limiting purposes.

As is apparent from the above, according to the examples of the disclosure, an entity used in a response of chatbot service can be easily identified.

According to the examples of the disclosure, an entity unused in a response of chatbot service can be easily identified.

According to the examples of the disclosure, an entity implicitly used in a response of chatbot service can be easily identified.

According to the examples of the disclosure, a user can easily identify whether a chatbot service understands what is intended by the user.

Meanwhile, the above-described examples can be stored in the form of a recording medium storing computer-executable instructions. The instructions may be stored in the form of a program code, and if executed by a processor, the instructions may perform operations of the disclosed examples. The recording medium may be implemented as a computer-readable recording medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

What is claimed is:

1. A method comprising:

generating, based on input text received via a user interface device, a plurality of key words and a plurality of types associated with the plurality of key words;

classifying, based on the generated key words and the types, an intent associated with the input text;

based on the classified intent and at least of one of the key words, searching for information;

displaying, on a display of the user interface device, the searched information and the plurality of key words;

adding, on the display of the user interface device, at least a visual effect for indicating whether a key word of the plurality of key words was used for the searching, wherein the adding comprises applying a first visual effect to a first key word, of the plurality of key words, used in the searching, and applying a second visual effect, different from the first visual effect, to a second key word, of the plurality of key words, excluded in the searching, and wherein the input text comprises the second key word;

receiving a user input, wherein the user input includes at least one user input for changing priorities of the plurality of key words by changing relative positions of the plurality of key words on the display, wherein the relative positions of the plurality of key words are changed by dragging and repositioning at least one key word whose priority is to be changed;

editing, based on the received user input, the plurality of key words; and based on the edited plurality of key words, searching again for the information.

2. The method of claim 1, wherein the searching comprises:

determining, based on an order of the input text, priorities of the plurality of key words; and based on the determined priorities, searching for the information.

3. The method of claim 2, wherein the searching comprises:

based on using a key word having a highest priority among the plurality of key words and excluding at least one of the plurality of key words, searching for the information.

4. The method of claim 1, further comprising:

displaying the input text on the display, wherein the displaying the plurality of key words comprises displaying, separately from the input text displayed on the display, the plurality of key words.

5. The method of claim 1, wherein the searching comprises, based on a previous input text received via the user interface device, utilizing a previous key word generated from the previous input text.

6. The method of claim 5, wherein the adding comprises displaying the visual effect for distinguishing, among the plurality of key words displayed on the display, the first key word, of the plurality of key words, used in the searching;

the second key word, of the plurality of key words, excluded in the searching; and the previous key word.

7. The method of claim 1, wherein the displaying the plurality of key words further comprises displaying a logical operator used in the searching.

8. The method of claim 1, wherein the user input further includes at least one of:

a first user input for deleting at least one of the plurality of key words; or a second user input for modifying at least one of the plurality of key words to another key word.

9. The method of claim 1, wherein the input text, corresponding to an initial search query, comprises the plurality of key words.

10. An apparatus comprising:

at least one processor; and a memory storing at least one instruction, that, when executed by the at least one processor, cause the apparatus to perform:

generating, based on input text received via a user interface device, a plurality of key words and a plurality of types associated with the plurality of key words;

classifying, based on the generated key words and the types, an intent associated with the input text;

based on the classified intent and at least of one of the key words, searching for information;

displaying, on a display of the user interface device, the searched information and the plurality of key words;

adding, on the display of the user interface device, a visual effect for indicating whether a key word of the plurality of key words was used for the searching, wherein the adding comprises applying a first visual effect to a first key word, of the plurality of key words, used in the searching, and applying a second visual effect, different from the first visual effect, to a second key word, of the plurality of key words, excluded in the searching, and wherein the input text comprises the second key word;

receiving a user input, wherein the user input includes at least one user input for changing priorities of the plurality of key words by changing relative positions of the plurality of key words on the display, wherein the relative positions of the plurality of key words are changed by dragging and repositioning at least one key word whose priority is to be changed;

editing, based on the received user input, the plurality of key words; and based on the edited plurality of key words, searching again for the information.

11. The apparatus of claim 10, wherein the at least one instruction, when executed by the at least one processor, cause the apparatus to perform the searching by:

determining, based on an order of the input text, priorities of the plurality of key words; and based on the determining, searching for the information.

12. The apparatus of claim 11, wherein the at least one instruction, when executed by the at least one processor, cause the apparatus to perform the searching by:

based on using a key word having a highest priority among the plurality of key words and excluding at least one of the plurality of key words, searching for the information.

13. The apparatus of claim 10, wherein the at least one instruction, when executed by the at least one processor, cause the apparatus to perform the displaying the plurality of key words by:

displaying the input text on the display; and displaying, separately from the input text displayed on the display, the plurality of key words.

14. The apparatus of claim 10, wherein the at least one instruction, when executed by the at least one processor, cause the apparatus to perform the searching, based on a previous input text received via the user interface device, by utilizing a previous key word generated from the previous input text.

15. The apparatus of claim 14, wherein the at least one instruction, when executed by the at least one processor, cause the apparatus to perform the adding by displaying the visual effect for distinguishing, among the plurality of key words displayed on the display, the first key word used in the searching;

the second key word excluded in the searching; and the previous key word.

16. The apparatus of claim 10, wherein the at least one instruction, when executed by the at least one processor, cause the apparatus to perform the displaying the plurality of key words by displaying a logical operator used in the searching.

17. The apparatus of claim 10, wherein the user input further includes at least one of:

a first user input for deleting at least one of the plurality of key words; or a second user input for modifying at least one of the plurality of key words to another key word.

18. The apparatus of claim 10, wherein the at least one instruction, when executed by the at least one processor, cause the apparatus to perform displaying the plurality of key words by:

displaying, without applying the visual effect, at least one first key word, of the plurality of key words, not used for the searching for information associated with the classified intent; and displaying, by applying the visual effect, at least one second key word, of the plurality of key words, used for the searching for information associated with the classified intent.

19. The apparatus of claim 10, wherein the input text, corresponding to an initial search query, comprises the plurality of key words.

20. An apparatus comprising:

at least one processor; and a memory storing at least one instruction, that, when executed by the at least one processor, cause the apparatus to perform:

based on input text received via a user interface device, displaying a plurality of key words and identifying a plurality of types associated with the plurality of key words, wherein the input text comprises the plurality of key words;

determining a search query comprising the plurality of key words;

classifying, based on the generated key words and the types, an intent associated with the input text;

based on the classified intent and a subset of the key words, searching for information associated with the classified intent;

displaying, on a display of the user interface device, the searched information and the search query comprising the plurality of key words by adding, on the display of the user interface device:

a first visual effect for indicating that at least one first key word of the plurality of key words was used for the searching; and a second visual effect, different from the first visual effect, for indicating that at least one second key word of the plurality of key words was not used for the searching:

receiving at least one user input for changing priorities of the plurality of key words by changing relative positions of the plurality of key words on the display, wherein the relative positions of the plurality of key words are changed by repositioning at least one key word whose priority is to be changed;

editing, based on the received user input, the plurality of key words; and based on the edited plurality of key words, searching again for the information.

* * * * *